US008483564B2

(12) United States Patent  
Mu et al.

(10) Patent No.: US 8,483,564 B2  
(45) Date of Patent: Jul. 9, 2013

(54) HYBRID OPTICAL ADD-DROP MULTIPLEXING NETWORK AND WAVELENGTH ALLOCATION FOR THE SAME

(75) Inventors: Ruomei Mu, East Brunswick, NJ (US); Ekaterina A. Golovchenko, Colts Neck, NJ (US); Haifeng Li, Morganville, NJ (US); Muhammad Haris, Eatontown, NJ (US)

(73) Assignee: Tyco Electronics Subsea Communications LLC, Eatontown, NJ (US)

( * ) Notice: Subject to any disclaimer, the term of this patent is extended or adjusted under 35 U.S.C. 154(b) by 291 days.

(21) Appl. No.: 12/847,251

(22) Filed: Jul. 30, 2010

(65) Prior Publication Data

US 2011/0026925 A1 Feb. 3, 2011

Related U.S. Application Data

(60) Provisional application No. 61/230,323, filed on Jul. 31, 2009.

(51) Int. Cl.  
*H04J 14/02* (2006.01)

(52) U.S. Cl.  
USPC .......... 398/79; 398/82; 398/83; 398/74; 398/46

(58) Field of Classification Search  
USPC .......... 398/79, 82–85, 74, 46, 48; 370/431  
See application file for complete search history.

(56) References Cited

U.S. PATENT DOCUMENTS

| | | | | |
|---|---|---|---|---|
| 5,530,575 A * | 6/1996 | Acampora et al. | ............ | 398/58 |
| 5,805,633 A * | 9/1998 | Uddenfeldt | .............. | 375/133 |
| 5,889,765 A * | 3/1999 | Gibbs | .............. | 370/310.2 |
| 6,137,787 A * | 10/2000 | Chawla et al. | ............ | 370/337 |
| 6,333,799 B1 * | 12/2001 | Bala et al. | .............. | 398/9 |
| 6,525,852 B1 * | 2/2003 | Egnell | ................ | 398/83 |
| 6,567,577 B2 * | 5/2003 | Abbott et al. | ............. | 385/24 |
| 6,587,239 B1 | 7/2003 | Hung | | |
| 6,892,032 B2 | 5/2005 | Milton et al. | | |
| 6,912,340 B2 * | 6/2005 | Bacque | ............... | 385/24 |
| 7,068,938 B1 | 6/2006 | Islam et al. | | |
| 7,254,337 B1 * | 8/2007 | Islam et al. | ............. | 398/83 |
| 7,574,140 B2 * | 8/2009 | Manna et al. | ............. | 398/105 |
| 2002/0118417 A1 * | 8/2002 | Barry et al. | ............ | 359/127 |
| 2003/0215238 A1 * | 11/2003 | Milton et al. | ............ | 398/83 |
| 2006/0039278 A1 | 2/2006 | Harby et al. | | |
| 2007/0025734 A1 * | 2/2007 | Oogushi et al. | ............. | 398/71 |

(Continued)

FOREIGN PATENT DOCUMENTS

WO 9631025 10/1996  
WO 00/76105 A1 12/2000

OTHER PUBLICATIONS

International Search Report and Written Opinion dated Sep. 23, 2010 issued in related International Patent Application No. PCT/US2010.043870.

(Continued)

*Primary Examiner* — Daniel Washburn  
*Assistant Examiner* — Hibret Woldekidan

(57) ABSTRACT

An optical add-drop network and wavelength allocation for the same wherein the system bandwidth is separated into a dedicated channel band and re-used channel bands, separated by guard bands, to allocate terminal connections to achieve a minimum number of re-used channel bands for the desired terminal connectivities.

20 Claims, 4 Drawing Sheets

U.S. PATENT DOCUMENTS

2007/0188851 A1* 8/2007 Islam et al. .................. 359/334
2010/0290786 A1* 11/2010 Abbott ........................... 398/79
2011/0274119 A1* 11/2011 Golovchenko et al. ....... 370/465
2012/0195592 A1* 8/2012 Barnard et al. ................ 398/48

OTHER PUBLICATIONS

Obara H: "Hybrid Routing Concept for Dense WDM Ring Networks", Electronic Letters, IEE Stevenage, GB, vol. 36, No. 17, Aug. 17, 2000, pp. 1482-1483, XP006015591, ISSN: 0013-5194.

Thomas Pfeiffer: "Enhancing PON Capabilities Using the Wavelength Domain. Joint ITU/IEEE workshop on Next Generation Access, Geneva, 2008", ITU-T Draft; Study Period 2009-2012, International Telecommunication Union,Geneva 2008, CH, vol. Study Group 15, Jul. 7, 2009, pp. 1-22, XP017569217.

Extended European Search Report issued in related EP Application No. 10805098 on May 7, 2013.

* cited by examiner

HYBRID OPTICAL ADD-DROP MULTIPLEXING NETWORK AND WAVELENGTH ALLOCATION FOR THE SAME

CROSS-REFERENCE TO RELATED APPLICATIONS

This application claims the benefit of U.S. Provisional Application Ser. No. 61/230,323 filed Jul. 31, 2009, the teachings of which are hereby incorporated herein by reference.

TECHNICAL FIELD

The present disclosure relates to optical transmission systems, and, in particular, to a hybrid optical add-drop multiplexing network and wavelength allocation scheme for the same.

BACKGROUND

To maximize the transmission capacity of an optical fiber transmission system, a single optical fiber may be used to carry multiple optical signals in what is called a wavelength division multiplexed system (hereinafter a WDM system). Modern WDM systems have a high traffic capacity, for example, a capacity to carry 128 or more channels at 10 gigabits per second (hereinafter Gb/s) or more.

The optical fiber transmission system may include a relatively long trunk segment that may be terminated at a transmitting and/or receiving trunk terminal. The optical fiber transmission system may further include one or more branching units situated along its trunk path. Each branching unit (BU) may be connected to a branch segment that terminates in a transmitting and/or receiving branch terminal. Known BUs may include one or more integrated optical add/drop multiplexers (OADM). Channels could be added to and/or dropped from the trunk segment of the optical transmission system via the OADM BUs.

In such OADM systems, connections between terminals in the network may be achieved by transmitting information signals on certain channels that are dropped to a receiving branch terminal through an OADM BU, and the receiving branch terminal may add new information signals on the same channel locations where old information was previously dropped, then re-transmit the optical signals carrying new information to another receiving terminal. Channel locations that are re-used by a terminal for transmitting information between multiple terminals are referred to herein as "re-used channels." Re-used channels allow communication of different information between different terminals utilizing the same portion of the system bandwidth. Consequently, the total network capacity can be increased.

Communication between terminals may also be achieved using broadband OADM wherein certain channels are dedicated for communication between the terminals and are not re-used for communicating between other terminals. Such channels are referred to herein as "dedicated channels." An OADM WDM system including both re-used and dedicated channels for establishing communication between terminals in the system may be considered a hybrid OADM system since it relies on both OADM channel types.

In general the channels within the system bandwidth should fit within a bandwidth that may be reliably amplified by the amplifiers used in the system. It is desirable to implement re-used channels to increase system capacity. However, when re-used channels are provided in a system, guard bands wherein no information signals are present must be provided in the system bandwidth to allow for filtering of the channels by re-used add/drop filters.

BRIEF DESCRIPTION OF THE DRAWINGS

Reference should be made to the following detailed description which should be read in conjunction with the following figures, wherein like numerals represent like parts.

DETAILED DESCRIPTION

In general, an OADM system consistent with the present disclosure involves a wavelength allocation configured according to the network topology in which terminals connect to each other. The wavelength allocation involves separating the usable system amplifier bandwidth into a band of dedicated channels, guard bands, and separate bands of re-used channels. Guard bands may be provided at the beginning and end of the system bandwidth, and/or guard bands in-between the information channel bands. This allocation allows for facile filtering of the re-used channels. The guard bands at both edges of the system bandwidth allow for filtering of line monitoring equipment (LME) tone and/or coherent optical time domain reflectometry (COTDR) tones used for monitoring system health.

Figure 1:
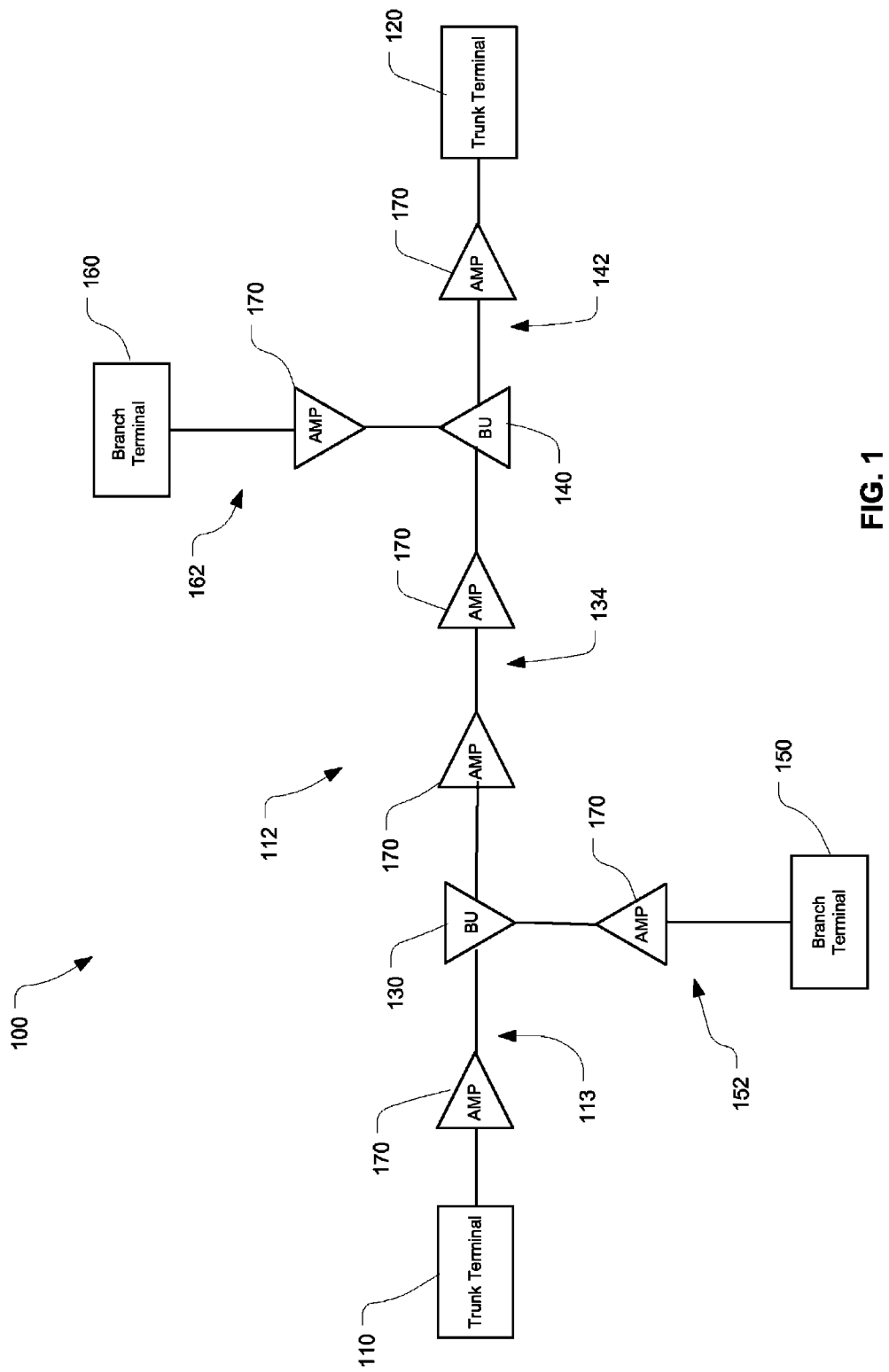
FIG. 1 is a schematic illustration of an optical communication system consistent with the present disclosure.

In FIG. 1, there is an illustration of an exemplary OADM optical communication system 100 consistent with the present disclosure. Those skilled in the art will recognize that the system 100 has been depicted in highly simplified form for ease of explanation. The optical communication system 100 includes trunk terminals 110 and 120 coupled to a trunk path 112. The term "coupled" as used herein refers to any connection, coupling, link or the like by which signals carried by one system element are imparted to the "coupled" element. Such "coupled" devices are not necessarily directly connected to one another and may be separated by intermediate components or devices that may manipulate or modify such signals.

The trunk path 112 may include a plurality of optical cable segments, e.g. cable segments 113, 134, 142, for carrying optical signals on associated optical channels/wavelengths. Each cable segment may include one or more sections of optical fiber cable including optical fiber pairs and one or more repeaters 170 to provide a transmission path for bi-directional communication of optical signals between trunk terminal 110 and trunk terminal 120.

One or more branching units, e.g., branching units 130 and 140, may be coupled to the trunk path between the trunk terminals 110, 120. Each branching unit 130, 140 may be further coupled to a branch terminal, e.g., branch terminals 150 and 160, respectively, perhaps through one or more repeaters 170 and linking optical cables. The system 100 may therefore be configured to provide bi-directional communication of optical signals between terminals 110, 120, 150 and/or 160. For ease of explanation the description herein may refer to transmission from one terminal to another. It is to be understood, however, that the system 100 may be configured for bi-directional or uni-directional communication between any of the terminals 110, 120, 150 and/or 160.

The components in the trunk and branch paths may include known configurations for achieving their intended functionality. The repeaters 170, for example, may include any known optical amplifier/repeater configuration that compensates for signal attenuation on the transmission path. For example, one or more of the repeaters may be configured as an optical amplifier, such as an erbium doped fiber amplifier, a Raman amplifier, or a hybrid Raman/EDFA amplifier. Also, one or more of the repeaters may be provided in a known optical-electrical-optical configuration that regenerates an optical signal by converting it to an electrical signal, processing the electrical signal and then retransmitting the optical signal. The system bandwidth may coincide with the usable bandwidth of the optical amplifiers within the system.

System 100 may be configured as a long-haul system, e.g. having a length between at least two of the terminals of more than about 600 km, and may span a body of water, e.g. an ocean. The branching units 130, 140 may be disposed in an undersea environment and may be seated on the ocean floor. The branching units 130, 140 may also or alternatively be in a terrestrial environment and may be co-located at the same central office as the branch terminals. The trunk path 112 path may thus span between beach landings, or may provide a terrestrial connection between two terminal stations.

In general, the branching units may add and drop channels to/from the trunk path. For example, a WDM signal may originate at one or more of the trunk terminals. The branching units may be configured either to pass some channels through the branching unit to travel uninterruptedly through the trunk path from the originating trunk terminal to a receiving trunk terminal, or other branching unit. One or more other channels may be added or dropped by the branching unit to/from the branch terminals.

For example, a WDM signal that originates at trunk terminal 110 may include one or more information signals that may occupy one or more channels Likewise, a WDM signal that originates at branch terminal 150 may also include one or more information signals. Both WDM signals may be transmitted to the branching unit 130. Certain channels may be passed from the originating trunk terminal to the trunk path directly through the branching unit 130 without interruption. Branching unit 130 may be configured to drop, i.e. extract, one or more channels originating from the trunk terminal 110 and pass the dropped signals to the branch terminal 150. Branching unit 130 may also be configured to add, i.e. insert, one or more local information signals on certain channels originating from branch terminal 150 to the WDM signal originating from the trunk terminal 110 and pass the resulting WDM optical signal, i.e. including the added information signals, onto segment 134. Also, the WDM signal originating from the trunk terminal 110 could be fully terminated at branching unit 130, in which case only the added information from branch terminal 150 would be passed onto segment 134.

The resulting WDM optical signal may be received by branching unit 140. Branching unit 140 may similarly pass through and/or add and/or drop certain channels. It will be appreciated that information signals that originate at terminal 120 and/or branch terminal 160 may be likewise added and/or dropped at branching unit 140 with a resulting optical signal transmitted to branching unit 130.

Figure 2:
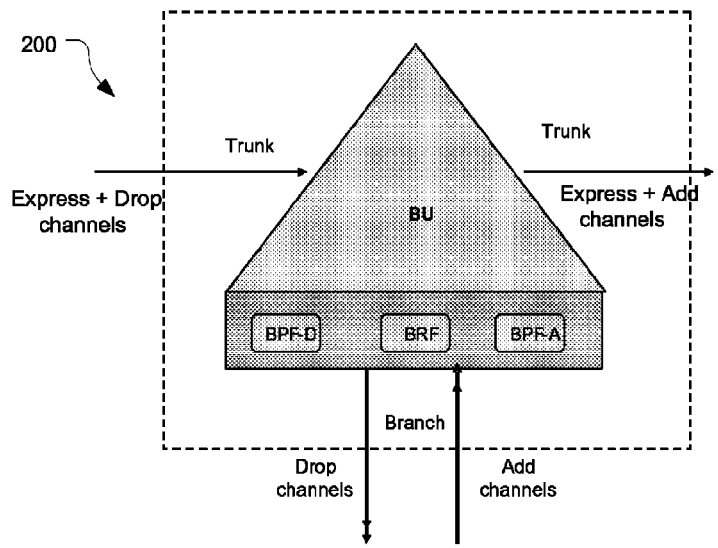
FIG. 2 is a schematic illustration of an embodiment of a branching unit useful in a system consistent with the present disclosure.

One exemplary embodiment of a branching unit 200 is diagrammatically illustrated in FIG. 2. The channels managed by the branching unit 200 may be described relative to the branching unit as express channels, drop channels, and add channels. As shown, express channels transmit through the branching unit from one trunk terminal to a receiving terminal without being routed into the branch fiber path. Drop channels are transmitted through the branching unit 200 from a trunk terminal to a fiber in the branch path. Add channels enter the branching unit through a fiber in the branch path and are transmitted through the branching unit to a fiber in one of the trunk paths.

To implement OADM in the branching unit, the branching unit may implement three functions: splitting, filtering and combining. With regard to the splitting function, optical power on one input fiber to the configuration is split into two or more outgoing fibers. An optical coupler is one example of a device that can implement the splitting function. Filtering involves blocking/transmitting portion of input optical spectrum from one or more outgoing fibers. An attenuator and an all-pass filter are examples of filter configurations that do not discriminate by optical wavelength. Optical filters that transmit or block one or more specific wavelength bands can be implemented using technologies known to those of ordinary skill in the art, e.g. thin films and fiber Bragg gratings. The combining function involves merging optical signals from two or more sources onto a single output fiber. An optical coupler is one example of a device that can implement the combining function.

Figure 3:
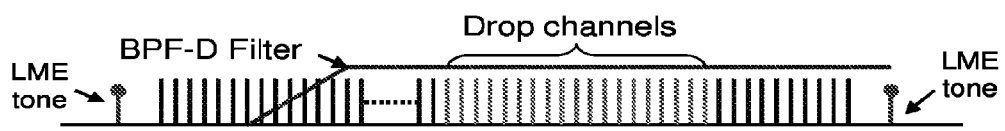
FIG. 3 illustrates an exemplary transmittance characteristic for a bandpass drop filter useful in connection with a branching unit.

In the illustrated exemplary embodiment, the OADM branching unit is illustrated as including three filter types: a band pass filter drop (BPF-D), a band pass filter add (BPF-A), and a band reuse filter (BRF). In the event that the branch segments are repeaterless, BRF-A and BRF-D may be optional. The filters may have fixed or reconfigurable transmittance characteristics. FIG. 3 diagrammatically illustrates the transmittance vs. wavelength for an exemplary BPF-D consistent with the present disclosure. The BPF-D is a band pass filter that may be used on the Drop branch. This filter may restrict the range of the trunk fiber spectrum entering the branch Drop fiber. The BPF-D may enable selective and unambiguous optical time domain reflectometry (OTDR) monitoring of the trunk and branch fibers from the terminals by passing a LME tone. Because the optical amplifiers in the branch fiber path are nominally configured with constant output power, and because the total output power is shared among the channels propagating through the branch repeaters, the BPF-D may pass into the branch fiber as many trunk channels as necessary to support optical power management in the channels propagating along the branch segments, and terminating at the branch stations.

Figure 4:
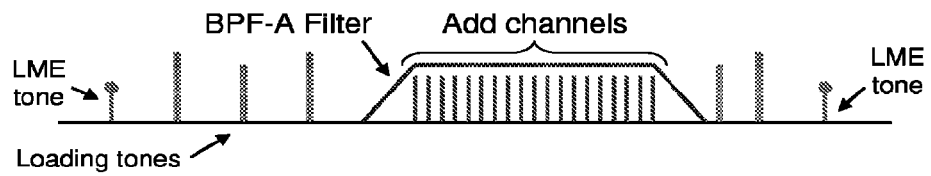
FIG. 4 illustrates an exemplary transmittance characteristic for a bandpass add filter useful in connection with a branching unit.

FIG. 4 diagrammatically illustrates the transmittance vs. wavelength for an exemplary BPF-A consistent with the present disclosure. The BPF-A is a band pass filter used on the Add branch. This filter may pass only Add channels from the branch to the trunk, blocking all other optical signals on the branch Add fiber. This filter may ensure that loading tones, e.g. noise loading tones, used on the branch path for optical power management do not reach the trunk path, where they could degrade express channels. This filter may also prevent branch LME signals from appearing in the trunk. For the branch segment with no repeaters locating along the branch path, the BPF-A filter in general may not be required.

Figure 5:
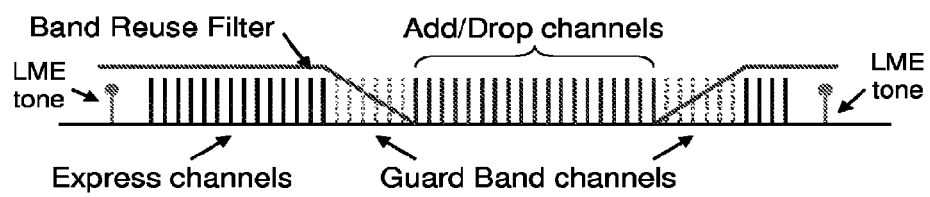
FIG. 5 illustrates an exemplary transmittance characteristic for a band reuse filter useful in connection with a branching unit and showing associated guard bands.

FIG. 5 diagrammatically illustrates the transmittance vs. wavelength for an exemplary BRF consistent with the present disclosure. The BRF is a band blocking filter used on the trunk path to enable the bandwidth for the re-used channels. The BRF may be introduced on the trunk path before an Add coupler. The BRF may remove the re-used channels in the trunk fiber in that portion of the fiber bandwidth where Add channels are to be inserted from the branch. Drop channels may occupy this same portion of the trunk fiber bandwidth, and the same wavelengths used for the Drop channels may thereby be made available to receive Add channels from the same branch. To provide differentiation between channels the BRF passes versus channels the BRF blocks, guard bands (restricted zones where no active information channels are allowed) may be defined at the edges of the filter bands. The guard bands may provide suppression of channel cross-talk at the branching unit. The number of channels that a guard band consumes depends on the guard band width and the channel spacing.

A hybrid OADM wavelength allocation system consistent with the present disclosure may be implemented to provide to minimize use of guard band channels in a system including re-used channels, dedicated channels and path monitoring LME/COTDR tones. Such a system leads to efficient use of the system bandwidth. As discussed above, consistent with the present disclosure the system bandwidth may be separated into a band of dedicated channels and separate bands of re-used channels. A "channel" as used herein refers to one of a pre-defined number of nominal wavelength locations associated with a system bandwidth. A "band" of channels as used herein refers to more than one channel. The band of dedicated channels includes only dedicated channels, and the bands of re-used channels include only re-used channels.

The dedicated channels and re-used channels may be add, drop or express channels with respect to any particular branching unit. The dedicated channels are however dedicated for communication between two specific terminals and are not re-used for communication with other terminals. The re-used channels are used for communication between two terminals and are then re-used for communication with other terminal connectitivities. Consistent with the present disclosure the system bandwidth may include guard bands at the beginning and end of the bandwidth and guard bands between the dedicated and re-used channel bands. The guard bands may included more than one channel and may not include any information channel, i.e. the guard bands may not include any dedicated channels or any re-used channels. This allocation allows for facile filtering of the re-used channels and the guard bands at the ends of the bandwidth allow for filtering of line monitoring equipment (LME) tone and/or coherent optical time domain reflectometry (COTDR) tones used for monitoring system health.

Figure 6:
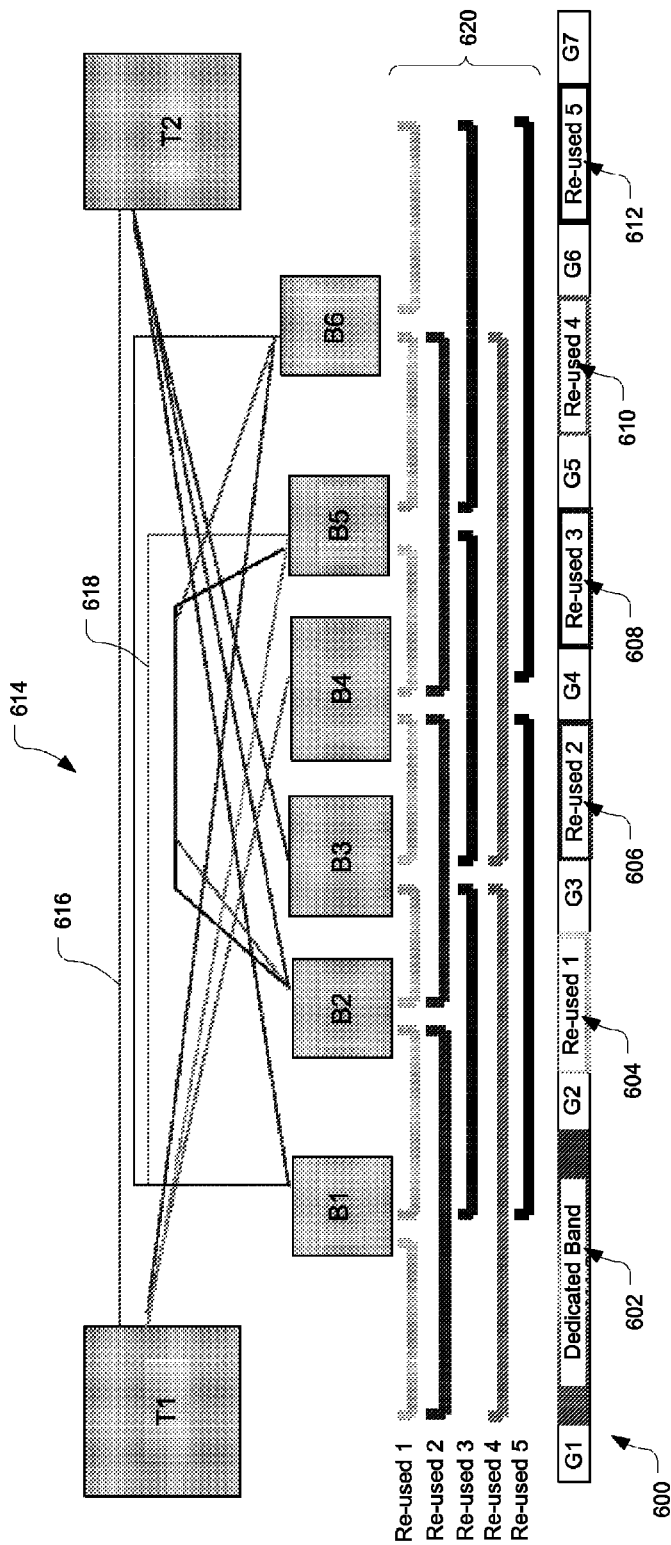
FIG. 6 diagrammatically illustrates an exemplary system bandwidth wavelength allocation consistent with the present disclosure and exemplary connections achieved using hybrid dedicated and re-used channels in a system consistent with the present disclosure.

FIG. 6 diagrammatically illustrates a wavelength allocation consistent with the present disclosure and illustrates an example of how the wavelength allocation may be used to establish terminal-to-terminal connections between each of eight different terminals, T1, T2 and B1 to B6, to establish a total of twenty-eight terminal to terminal connections. In the illustrated exemplary embodiment, the system bandwidth wavelength allocation includes guard bands G1 and G7 at each end of the system bandwidth to allow filtering of LME or COTDR tones. The system bandwidth is further separated into a band of dedicated channels 602 and multiple bands of re-used channels, i.e. five re-used channel bands 604, 606, 608, 610 and 612 in the illustrated embodiment. The dedicated channel band and the re-used channel bands are separated from each other by guard bands G2, G3, G4, G5 and G6.

The specific number of re-used channel bands and the number of channels within the dedicated band, the re-used channel bands and the guard bands depends on the number and nature of the desired connectivity pattern and desired logical terminal-to-terminal connections, the available system bandwidth, and the system channel spacing. In one exemplary embodiment consistent with the configuration of FIG. 6, a usable amplifier/system bandwidth of up to 34 nm may be used to support 224 information channels at 10 Gb/s to establish twenty eight terminal-to-terminal connections supported by eight channels for each connection with optimally mapping the connections to the adequate channel bands. As used herein, a "terminal-to-terminal connection" generally refers to one or more information channels established between two terminals. A "logical terminal-to-terminal connection" refers to a single information channel provided between two terminals. In the example of FIG. 6, 28 terminal-to-terminal connections include eight channels each to establish 224 (i.e. 28×8) logical terminal-to-terminal connections.

Consistent with the present disclosure, a connectivity pattern including a larger number of logical-terminal to terminal connections than the number of available physical channels in the system bandwidth may be established by allocating the system bandwidth to provide a minimal number of re-used bands. In the example shown in FIG. 6, each bracket group beneath the branch terminals represents a group of connections possessing the same connectivity pattern. As a result, a different re-used band can be allocated to each such group so the bandwidth can be maximally shared for multiple connections. In one embodiment 36 guard band channels may be used to provide adequate channel separation among different bands as well as for the LME tones.

Use of re-used channels facilitates more logical terminal connections than could be achieved using only dedicated channels. For example, the optimized wavelength allocation in FIG. 6 produces an equivalent of a total of 224 logical terminal-to-terminal connections at a cost of 164 physical channels. In such an embodiment, the re-used channel bands 604, 606, 608, 610 and 612 may include eight channels each, the dedicated channel band 602 may include eleven groups of eight channels (one group for each connection) that may be meshed/interleaved or separated into eight channel sub-bands within the dedicated channel band; or eleven sequential sub-bands with eight channels inside each sub-bands. The guard bands G1, G7 at the ends of the system bandwidth may be include three channels, and the guard bands G2, G3, G4, G5 and G6 between the dedicated channel bands and the re-used channel bands may be six channels each depending on re-used filtering and system channel spacing. The channel number in each guard band may be determined by the characteristics of re-use filters or ADD/Drop filters. The channel number may vary based on filtering technologies that will be employed by the system.

The top portion of FIG. 6 diagrammatically illustrates each of the twenty-eight terminal-to-terminal connections using either the dedicated channel band or the re-used channel bands. The illustrated exemplary embodiment includes first T1 and second T2 trunk terminals and six branch terminals, B1, B2, B3, B4, B5 and B6. The transmission paths, branching units and amplifiers for establishing connections between the terminals are not shown in FIG. 6 for ease of illustration. The lines 614 interconnecting the terminals T1, T2 and B1 to B6 in FIG. 9 illustrate eleven terminal-to-terminal connections established using the dedicated channel band 602. Each of the connections established using the dedicated channel band may use a portion, e.g. 8 channels, of the channel band, i.e. either a sub-band of the sequential dedicated channel band or a meshed/interleaved group of channels from the dedicated channel band. For example, a portion of the dedicated channel band may be used for communicating from T1 to T2 as indicated by line 616, B1 to B5 as indicated by line 618, etc.

The brackets 620 illustrated beneath the branch terminals in FIG. 6 illustrate seventeen terminal-to-terminal connections established using re-used channel bands 1 through 5, i.e. 604, 606, 608, 610 and 612, respectively. Each re-used channel band provides a group of connections possessing the same connectivity pattern. For example, re-used channel band 1 (604) may be used to establish connection from T1 to B1 and then may be re-used to establish connection from B1 to B2, from B2 to B3, from B4 to B5, etc. in a connectivity pattern where adjacent terminals are connected using the re-used channel band 1. Re-used channel band 2 (606), however, may be used to establish connection from T1 to B2 and then may be re-used to establish connection from B2 to B4 and from B4 to B6 in a connectivity pattern where connections skip an adjacent terminal to make connection with the next adjacent terminal. Re-used channel bands 3-5 also provide terminal-to-terminal connections in different associated connectivity patterns, as shown.

Table 1 below lists each of the twenty-eight terminal-to-terminal connections illustrated in FIG. 6 and identifies the portion of the system bandwidth, i.e. dedicated band or re-used band 1 through 5, used to make the connection. In the table, terminal-to-terminal connections are notated as X-Y where X is one terminal and Y is another terminal. For example, the notation B1-B2 refers to a connection between branch terminals B1 and B2 in any direction.

TABLE 1

| Re-used 1 | Re-used 2 | Re-used 3 | Re-used 4 | Re-used 5 | Dedicated |
|---|---|---|---|---|---|
| 1. T1-B1 | 8. T1-B2 | 11. B1-B3 | 14. T1-B3 | 16. B1-B4 | 18. B1-B5 |
| 2. B1-B2 | 9. B2-B4 | 12. B3-B5 | 15. B3-B6 | 17. B4-T2 | 19. B1-B6 |
| 3. B2-B3 | 10. B4-B6 | 13. B5-T2 | | | 20. B1-T2 |
| 4. B3-B4 | | | | | 21. B2-B5 |
| 5. B4-B5 | | | | | 22. B2-B6 |
| 6. B5-B6 | | | | | 23. B2-T2 |
| 7. B6-T2 | | | | | 24. B3-T2 |
| | | | | | 25. B4-T1 |
| | | | | | 26. B5-T1 |
| | | | | | 27. B6-T2 |
| | | | | | 28. T2-T1 |

Figure 7:
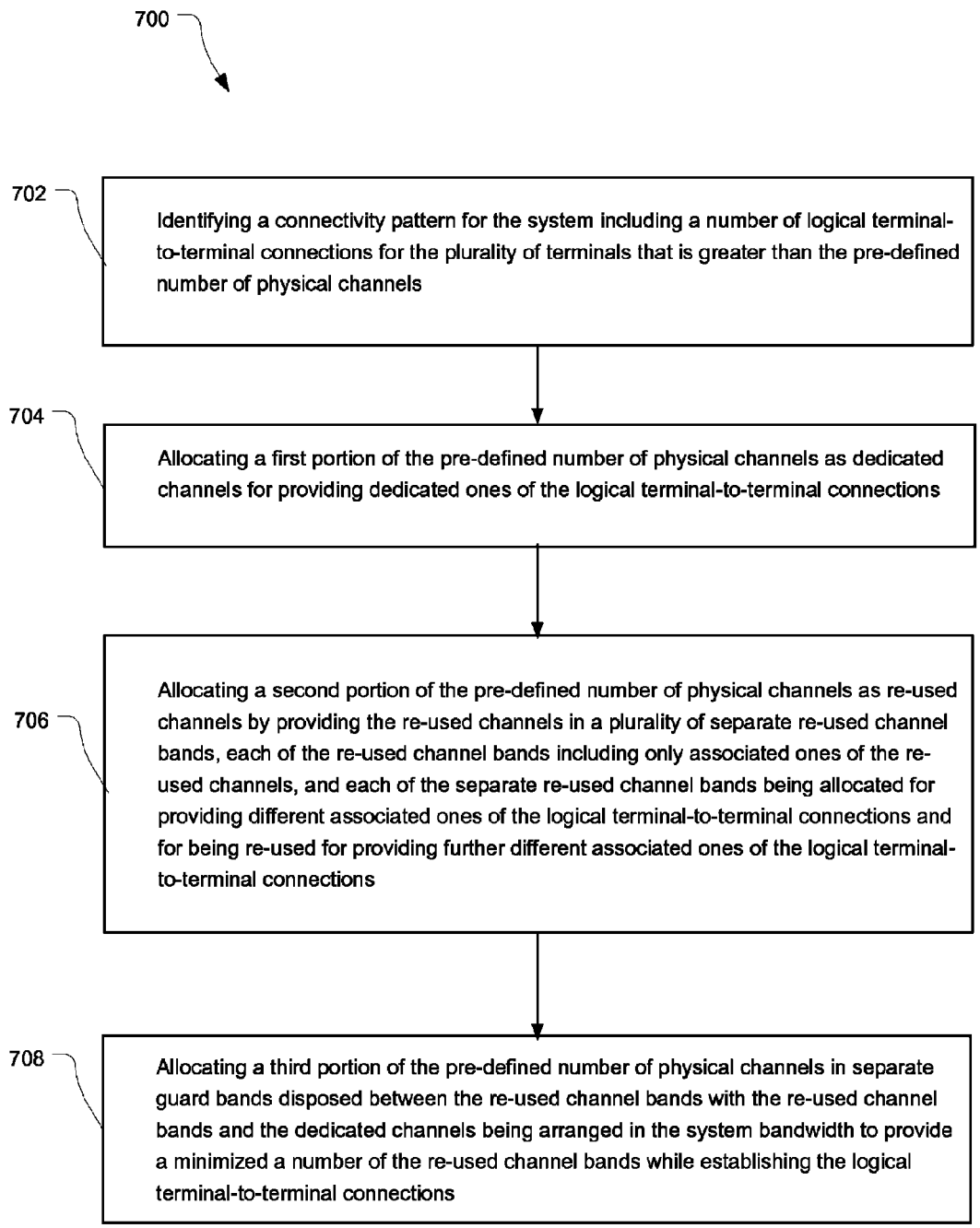
FIG. 7 is a block flow diagram illustrating one exemplary method of allocating wavelengths in a WDM system consistent with the present disclosure.

FIG. 7 is a block flow diagram of one method 700 of allocating system bandwidth including a pre-defined number of channels in a WDM optical system including a plurality of terminals with first and second trunk terminals and at least one branch terminal. The illustrated block flow diagram may be shown and described as including a particular sequence of steps. It is to be understood, however, that the sequence of steps merely provides an example of how the general functionality described herein can be implemented. The steps do not have to be executed in the order presented unless otherwise indicated.

In the exemplary embodiment illustrated in FIG. 7, a connectivity pattern is identified 702 for the system. The connectivity pattern may include a number of logical terminal-to-terminal connections for the plurality of terminals that is greater than the pre-defined number of physical channels. A first portion of the pre-defined number of physical channels is allocated 704 as dedicated channels for providing dedicated ones of the logical terminal-to-terminal connections. A second portion of the pre-defined number of physical channels is allocated 706 as re-used channels by providing the re-used channels in a plurality of separate re-used channel bands. Each of the re-used channel bands include only associated ones of the re-used channels, and each of the separate re-used channel bands are allocated for providing different associated ones of the logical terminal-to-terminal connections and for being re-used for providing further different associated ones of the logical terminal-to-terminal connections. A third portion of the pre-defined number of physical channels is allocated 708 in separate guard bands disposed between the re-used channel bands with the re-used channel bands and the dedicated channels being arranged in the system bandwidth to provide a minimized a number of the re-used channel bands while establishing the logical terminal-to-terminal connections.

Consistent with the present disclosure, separating the system bandwidth into a dedicated band and re-used bands, separated by guard bands, allows for facile filtering of the re-used bands and in system OADM branching units in a manner that allows for allocating more communication channels for terminal-to-terminal connections compared to systems wherein dedicated channels are allocated for every terminal-to-terminal connection. Optimizing the mapping between the terminal connections to the re-used bands as described in above may reduce the number of re-used bands. Less number of guard bands may be required to improve wavelength efficiency within the system bandwidth consistent with the present disclosure. A wavelength allocation scheme consistent with the present disclosure may also be configured to channels with other specialized requirements into the re-used bands. For example, channels associated with links having specialized security requirements, specialized terminal requirements, different data rates, etc. may be grouped into one or more re-used bands in a wavelength allocation configuration consistent with the present disclosure to allow facile filtering of such channels.

According to one aspect of the disclosure there is provided a method of hybrid OADM wavelength allocation in a wavelength division multiplexed (WDM) optical system including a plurality of terminals, the method including: providing a band of dedicated channels that are dedicated for communication between associated ones of the terminals; providing one or more bands of reused channels for communicating between other associated ones of the terminals and for being re-used for communicating with at least one additional terminal-to-terminal connection; and separating the band of dedicated channels and the one or more bands of re-used channels with guard bands.

According to another aspect of the disclosure, there is provided a wavelength division multiplexed (WDM) optical system including: at least two dedicated terminals configured to communicate using channels of a dedicated channel band of a system bandwidth; at least two re-used terminals configured to communicate using channels of a re-used channel band of the system bandwidth; and at least one additional re-used terminal configured to communicate with one of the two re-used terminals using the channels of the re-used channel band, the dedicated channel band and the re-used channel band being separated by a guard band.

According to another aspect of the disclosure, there provided an example of an optimized wavelength allocation scheme. Based on the connectivity pattern, one may map the multiple termination connections to least number of re-used bands, so the number of communication channels assigned for each pair of terminal connections (i.e. the logical-terminal-to-terminal connections associated with the pair) can be maximized with the available amplifier/system bandwidth.

According to another aspect of the disclosure there is provided a method of allocating system bandwidth including a pre-defined number of physical channels in a WDM optical system including a plurality of terminals with first and second trunk terminals and at least one branch terminal. In such method a connectivity pattern may be identified for the system. The connectivity pattern may include a number of logical terminal-to-terminal connections for the plurality of terminals that is greater than the pre-defined number of physical channels. A first portion of the pre-defined number of physical channels may be allocated as dedicated channels for providing dedicated ones of the logical terminal-to-terminal connections. A second portion of the pre-defined number of physical channels may be allocated as re-used channels by providing the re-used channels in a plurality of separate re-used channel bands. Each of the re-used channel bands include only associated ones of the re-used channels, and each of the separate re-used channel bands are allocated for providing different associated ones of the logical terminal-to-terminal connections and for being re-used for providing further different associated ones of the logical terminal-to-terminal connections. A third portion of the pre-defined number of physical channels may allocated in separate guard bands disposed between the re-used channel bands with the re-used channel bands and the dedicated channels being arranged in the system bandwidth to provide a minimized a number of the re-used channel bands while establishing the logical terminal-to-terminal connections.

According to another aspect of the disclosure there is provided a wavelength division multiplexed (WDM) communication system having a system bandwidth including a pre-defined number of physical channels. The system includes a plurality of terminals including first and second trunk terminals and at least one branch terminals in a connectivity pattern including a number of logical terminal-to-terminal connections for the plurality of terminals that is greater than the pre-defined number of channels. The system bandwidth is allocated with a first portion of the pre-defined number of channels including dedicated channels for providing dedicated ones of the logical terminal-to-terminal connections; a second portion of the pre-defined number of channels including re-used channels provided in a plurality of separate re-used channel bands, each of the re-used channel bands including only associated ones of the re-used channels, and each of the separate re-used channel bands being allocated for providing different associated ones of the logical terminal-to-terminal connections and for being re-used for providing further different associated ones of the logical terminal-to-terminal connections; and a third portion of the pre-defined number of channels being in separate guard bands disposed between the re-used channel bands. The re-used channel bands and the dedicated channels are arranged in the system bandwidth to provide a minimized a number of the re-used channel bands while establishing the logical terminal-to-terminal connections.

The embodiments that have been described herein, however, are but some of the several which utilize this invention and are set forth here by way of illustration but not of limitation. Many other embodiments, which will be readily apparent to those skilled in the art, may be made without departing materially from the spirit and scope of the invention as defined in the appended claims.

What is claimed is:

1. A method of allocating system bandwidth comprising a pre-defined number of physical channels in a wavelength division multiplexed (WDM) optical system including a plurality of terminals comprising first and second trunk terminals and at least one branch terminal, said method comprising:
    identifying a connectivity pattern for said system comprising a number of logical terminal-to-terminal connections for said plurality of terminals that is greater than the pre-defined number of physical channels;
    allocating a first portion of the pre-defined number of physical channels as dedicated channels, each of said dedicated channels for providing dedicated ones of said logical terminal-to-terminal connections between an associated two of said plurality of terminals, and not for providing communication with any of said plurality of terminals other than said associated two of said plurality of terminals;
    allocating a second portion of the pre-defined number of physical channels as re-used channels by providing said re-used channels in a plurality of separate re-used channel bands,
    each of said re-used channel bands comprising only associated ones of said re-used channels, and each of said separate re-used channel bands being allocated for providing ones of said logical terminal-to-terminal connections between associated first and second ones of said plurality of terminals and for being re-used for providing ones of said logical terminal-to-terminal connections between associated third and fourth ones of said plurality of terminals, at least one of said associated third and fourth ones of said plurality of terminals being a different terminal than said associated first and second ones of said plurality of terminals; and
    allocating a third portion of the pre-defined number of physical channels in separate guard bands disposed between said re-used channel bands;
    said re-used channel bands and said dedicated channels being arranged in the system bandwidth to provide a minimized a number of said re-used channel bands while establishing said logical terminal-to-terminal connections.

2. A method according to claim 1, wherein each of said re-used channel bands is allocated for providing terminal-to-terminal connections between said plurality of terminals in a different common associated connectivity pattern.

3. A method according to claim 1, wherein said dedicated channels are allocated in a separate dedicated channel band comprising only said dedicated channels.

4. A method according to claim 1, wherein each of said guard bands does not include any of said re-used or said dedicated channels.

5. A method according to claim 1, said method further comprising allocating a fourth portion of the pre-defined number of physical channels in first and second end guard bands provided at respective ends of the system bandwidth.

6. A method according to claim 1, wherein the system bandwidth is less than or equal to 35 nm.

7. A method according to claim 1, wherein the pre-defined number of channels is 128 channels.

8. A method according to claim 1, wherein each of said re-used channel bands comprises only 8 of said re-used channels.

9. A method according to claim 1, wherein said guard bands each comprises only 6 of the pre-defined number of said channels.

10. A method according to claim 1, wherein said end guard bands each comprises only 3 of the pre-defined number of said channels.

11. A wavelength division multiplexed (WDM) communication system having a system bandwidth comprising a pre-defined number of physical channels comprising:
- a plurality of terminals comprising first and second trunk terminals and at least one branch terminals in a connectivity pattern comprising a number of logical terminal-to-terminal connections for said plurality of terminals that is greater than the pre-defined number of physical channels;
- the system bandwidth being allocated with
- a first portion of the pre-defined number of physical channels comprising dedicated channels, each of said dedicated channels for providing dedicated ones of said logical terminal-to-terminal connections between an associated two of said plurality of terminals, and not for providing communication with any of said plurality of terminals other than said associated two of said plurality of terminals;
- a second portion of the pre-defined number of physical channels comprising re-used channels provided in a plurality of separate re-used channel bands,
- each of said re-used channel bands comprising only associated ones of said re-used channels, and each of said separate re-used channel bands being allocated for providing ones of said logical terminal-to-terminal connections between first and second ones of said plurality of terminals and for being re-used for providing ones of said logical terminal-to-terminal connections between associated third and fourth ones of said plurality of terminals, at least one of said associated third and fourth ones of said plurality of terminals being a different terminal than said associated first and second ones of said plurality of terminals; and
- a third portion of the pre-defined number of physical channels being in separate guard bands disposed between said re-used channel bands;
- said re-used channel bands and said dedicated channels being arranged in the system bandwidth to provide a minimized a number of said re-used channel bands while establishing said logical terminal-to-terminal connections.

12. A system according to claim 11, wherein each of said re-used channel bands is allocated for providing terminal-to-terminal connections between said plurality of terminals in a different common associated connectivity pattern.

13. A system according to claim 11, wherein said dedicated channels are allocated in a separate dedicated channel band comprising only said dedicated channels.

14. A system according to claim 11, wherein each of said guard bands does not include any of said re-used or said dedicated channels.

15. A system according to claim 11, wherein the system bandwidth is further allocated with a fourth portion of the pre-defined number of channels in first and second end guard bands provided at respective ends of the system bandwidth.

16. A system according to claim 11, wherein the system bandwidth is less than or equal to 35 nm.

17. A system according to claim 11, wherein the pre-defined number of channels is 128 channels.

18. A system according to claim 11, wherein each of said re-used channel bands comprises only 8 of said re-used channels.

19. A system according to claim 11, wherein said guard bands each comprises only 6 of the pre-defined number of said channels.

20. A system according to claim 11, wherein said end guard bands each comprises only 3 of the pre-defined number of said channels.

* * * * *